Jan. 29, 1924.

M. A. MARQUETTE 1,482,240

TIRE BEAD

Filed Feb. 21, 1920

INVENTOR
Melvon A. Marquette.
BY
Franklin G. Neal
ATTORNEY

Patented Jan. 29, 1924.

1,482,240

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE BEAD.

Application filed February 21, 1920. Serial No. 360,312.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in a Tire Bead, of which the following is a specification.

My invention relates to the structure of the bases or beads of tire casings.

It has for its object the improvement of bead members for tire casings in the several features which will appear from the specification and claims. It has for its specific object the provision of a bead which will cause the inner plies of fabric forming the casing to be tensioned uniformly with respect to the outer plies; which will reduce to a minimum the amount of wire reinforcement consistent with strength; and which will generally afford a secure and satisfactory anchorage.

Figure 1:
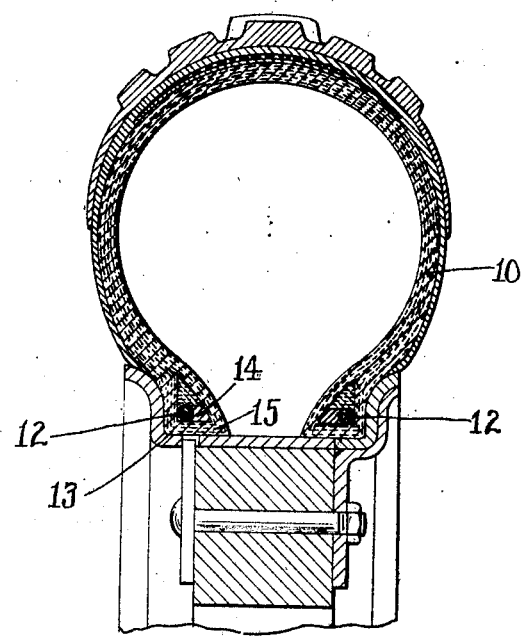
Figure 2:
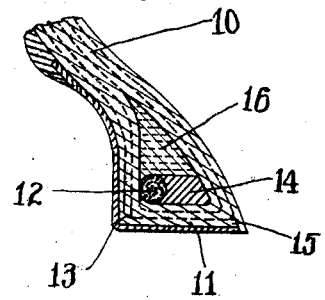

The invention will now be described with particular reference to the accompanying drawings, in which:

Fig. 1 is a cross section of a tire casing mounted upon a rim and embodying my improved bead construction; and Fig. 2 is an enlarged sectional detail of the casing showing the structure of the bead.

As is customary in the manufacture of tire casings, the fabric plies 10 forming the strength-giving portion of the casing are folded as at 11 about a filler substantially triangular in cross section. It is to this filler and to its function of anchoring the fabric plies 10 that my invention relates. In "straight side" tire casings, for which my improved bead construction is especially adapted, it is necessary that the filler contain reinforcing means which will render it substantially inextensible in a circumferential direction. Where the whole filler is made inextensible, I have found that a weakening of the tire casing results from the over-tensioning of the inner plies. As the tire is flexed these plies are the first to be tensioned, and unless there is a slight elasticity to their anchorage they will be forced to take the major portion of the load. If, however, there be insufficient anchorage near the toe or inner portion of the bead there is danger of the bead tilting and permitting the inner tube to become trapped between it and the rim, with consequent rupturing of the tube.

I have avoided these difficulties by constructing the bead with an inextensible reinforcement, as a wire cable 12, near the heel 13 of the bead; and a slightly extensible but substantially rigid circular reinforcement 14, preferably made of hard rubber, such as the stock used for clincher beads, and located adjacent to the toe 15 of the bead. Above the two reinforcements described above is a substantially triangular filler member 16. This filler member 16 is preferably flexible in substantially the same degree as the casing itself, so that it will build out the contour of the bead without restricting the bending of the lower portion of the casing.

The action of a bead constructed as described is as follows: The reinforcement 12, being inextensible, will hold the bead in position on the rim, and will prevent any undue expansion of the bead as a whole. The reinforcement 14, however, will yield sufficiently to permit of a slight movement of the inner plies forming the casing before they are firmly held. It will be noted that in the usual construction of tire casings the inner fabric plies are folded around the inner side of the bead, while the outer fabric plies are folded around the outer side of the bead. This movement of the fabric layers is very slight, and is more in the nature of a readjustment of tension than an actual movement. The toe portion of the bead member is slightly extensible—enough to permit the inner plies anchored thereby to yield until the outer plies take up the load about equally with the inner plies whereby all plies may be brought more nearly to the equal tension desired in a straight side tire.

I claim:

A tire casing having in each of the base edges thereof a triangular bead member consisting of an inextensible anchoring means located closely adjacent to the bottom and outer corner of the triangular member, a slightly extensible anchoring means located closely adjacent to the bottom of the triangular member and extending from said first anchoring means to the inner corner of the triangular member, and a flexible filler means extending from the top of said anchoring means to the top corner of the triangular member, said casing having inner plies of fabric anchored principally by the inner corners and outer plies anchored principally by the outer corners of said triangular members.

MELVON A. MARQUETTE.